US010839826B2

(12) United States Patent
Humphrey et al.

(10) Patent No.: US 10,839,826 B2
(45) Date of Patent: Nov. 17, 2020

(54) EXTRACTING SIGNALS FROM PAIRED RECORDINGS

(71) Applicant: Spotify AB, Stockholm (SE)

(72) Inventors: Eric J. Humphrey, Brooklyn, NY (US); Andreas Jansson, New York, NY (US); Nicola Montecchio, Berlin (DE)

(73) Assignee: SPOTIFY AB, Stockholm (SE)

( * ) Notice: Subject to any disclaimer, the term of this patent is extended or adjusted under 35 U.S.C. 154(b) by 183 days.

(21) Appl. No.: 15/974,767

(22) Filed: May 9, 2018

(65) Prior Publication Data

US 2019/0043528 A1 Feb. 7, 2019

Related U.S. Application Data

(60) Provisional application No. 62/540,835, filed on Aug. 3, 2017.

(51) Int. Cl.
*G10L 25/78* (2013.01)
*G06F 16/683* (2019.01)
*G10L 25/51* (2013.01)
*G10L 25/03* (2013.01)

(52) U.S. Cl.
CPC ............ *G10L 25/78* (2013.01); *G06F 16/683* (2019.01); *G10L 25/51* (2013.01); *G10L 25/03* (2013.01)

(58) Field of Classification Search
CPC ......... G10L 25/93; G10L 15/05; G10L 15/20; G10L 25/84; G06F 16/683; G06F 16/60; G06F 21/10; G06F 21/16; G06F 21/6209; G06F 2221/0724; G06F 2221/0733; G06F 2221/0737; G06F 2221/2149; G06F 13/4045; G06F 13/4072; G06F 13/4291; G06F 16/7834; G06F 17/50; G06F 1/14; G06F 9/50; G06F 9/5011
See application file for complete search history.

(56) References Cited

U.S. PATENT DOCUMENTS

| | | | | |
|---|---|---|---|---|
| 6,967,275 B2 * | 11/2005 | Ozick | ................... | G10H 1/361 434/307 A |
| 7,521,622 B1 * | 4/2009 | Zhang | ................... | G10L 25/78 84/603 |
| 8,541,676 B1 * | 9/2013 | Waldman | ............. | G10H 1/0008 84/603 |
| 8,543,395 B2 * | 9/2013 | Todic | ..................... | G10L 15/05 704/10 |

(Continued)

OTHER PUBLICATIONS

Maddage, Namunu Chinthaka, Changsheng Xu, and Ye Wang. "Singer identification based on vocal and instrumental models." Proceedings of the 17th International Conference on Pattern Recognition, 2004. ICPR 2004.. vol. 2. IEEE, 2004.*

(Continued)

*Primary Examiner* — Matthew H Baker
(74) *Attorney, Agent, or Firm* — Merchant & Gould P.C.

(57) ABSTRACT

A system, method and computer product for extracting an activity from recordings. The method comprises searching for signals representing plural versions of a track, determining feature representations of the plural versions of the track identified in the searching, aligning the feature representations determined in the determining, and extracting a time varying activity signal from the feature representations aligned in the aligning.

31 Claims, 9 Drawing Sheets

(56) References Cited

U.S. PATENT DOCUMENTS

| | | | | |
|---|---|---|---|---|
| 8,793,335 | B2* | 7/2014 | Kim | G06Q 30/00 |
| | | | | 709/217 |
| 9,047,371 | B2* | 6/2015 | Mohajer | H04H 60/372 |
| 9,384,272 | B2* | 7/2016 | Bertin-Mahieux | G06F 16/683 |
| 9,661,361 | B2* | 5/2017 | Sharifi | H04N 21/23418 |
| 2004/0064209 | A1* | 4/2004 | Zhang | G10L 25/78 |
| | | | | 700/94 |
| 2007/0076902 | A1* | 4/2007 | Master | H04S 7/00 |
| | | | | 381/94.3 |
| 2008/0097754 | A1* | 4/2008 | Goto | G10L 15/26 |
| | | | | 704/214 |
| 2009/0013004 | A1* | 1/2009 | Manukyan | G10H 1/0008 |
| 2011/0054910 | A1* | 3/2011 | Fujihara | G10L 15/26 |
| | | | | 704/278 |
| 2011/0288862 | A1* | 11/2011 | Todic | G10L 15/05 |
| | | | | 704/235 |
| 2012/0072841 | A1* | 3/2012 | Moricca | G06Q 10/10 |
| | | | | 715/716 |
| 2013/0226850 | A1* | 8/2013 | Hannuksela | G06F 16/58 |
| | | | | 706/14 |
| 2015/0025892 | A1* | 1/2015 | Lee | G10L 21/003 |
| | | | | 704/267 |
| 2016/0093316 | A1* | 3/2016 | Paquier | G10L 25/48 |
| | | | | 704/278 |
| 2017/0047094 | A1* | 2/2017 | Leppanen | G11B 27/031 |
| 2019/0311745 | A1* | 10/2019 | Shenkler | G10L 21/0272 |

OTHER PUBLICATIONS

Lee, Kyungyun, and Juhan Nam. "Learning a Joint Embedding Space of Monophonic and Mixed Music Signals for Singing Voice." arXiv preprint arXiv:1906.11139 (2019).*

Murthy, YV Srinivasa, Shashidhar G. Koolagudi, and Vishnu G. Swaroop. "Vocal and Non-vocal Segmentation based on the Analysis of Formant Structure." 2017 Ninth International Conference on Advances in Pattern Recognition (ICAPR). IEEE, 2017.*

Berenzweig, Adam L., and Daniel PW Ellis. "Locating singing voice segments within music signals." Proceedings of the 2001 IEEE Workshop on the Applications of Signal Processing to Audio and Acoustics (Cat. No. 01TH8575). IEEE, 2001.*

Lee, Kyogu, and Markus Cremer. "Automatic labeling of training data for singing voice detection in musical audio." IASTED International Conference on Signal Processing, Pattern Recognition and Applications (SPPRA). 2009.*

S. Ewert, M. Muller and P. Grosche, "High resolution audio synchronization using chroma onset features," 2009 IEEE International Conference on Acoustics, Speech and Signal Processing, Taipei, 2009, pp. 1869-1872. doi: 10.1109/ICASSP.2009.4959972.*

H. Fujihara and M. Goto, "Three techniques for improving automatic synchronization between music and lyrics: Fricative detection, filler model, and novel feature vectors for vocal activity detection," 2008 IEEE International Conference on Acoustics, Speech and Signal Processing, Las Vegas, NV, 2008, pp. 69-72.*

S. Wang, S. Ewert and S. Dixon, "Robust and Efficient Joint Alignment of Multiple Musical Performances," in IEEE/ACM Transactions on Audio, Speech, and Language Processing, vol. 24, No. 11, pp. 2132-2145, Nov. 2016. doi: 10.1109/TASLP.2016.2598318.*

C. Raffel and D. P. W. Ellis, "Optimizing DTW-based audio-to-MIDI alignment and matching," 2016 IEEE International Conference on Acoustics, Speech and Signal Processing (ICASSP), Shanghai, 2016, pp. 81-85. doi: 10.1109/ICASSP.2016.7471641.*

Wang, Siying, Sebastian Ewert, and Simon Dixon. "Compensating for asynchronies between musical voices in score-performance alignment." 2015 IEEE International Conference on Acoustics, Speech and Signal Processing (ICASSP). IEEE, 2015.*

Serra, Joan, et al. "Chroma binary similarity and local alignment applied to cover song identification." IEEE Transactions on Audio, Speech, and Language Processing 16.6 (2008): 1138-1151.*

Maddage, Namunu Chinthaka, Changsheng Xu, and Ye Wang. "A SVM C Based Classification Approach to Musical Audio." (2003).*

Berenzweig, A. and Ellis, D., "Locating singing voice segments within music signals," In Int'l Conference on Acoustics, Speech and Signal Processing (ICASSP), pp. 119-122. IEEE, 2001.

Bittner et al., "MedleyDB: A multitrack dataset for annotation-intensive MIR research," In Proceedings of the 15th Int'l Society for Music Information Retrieval Conference (IS-MIR), vol. 14, pp. 155-160, 2014.

Brown, J., "Calculation of a constant q spectral transform," The Journal of the Acoustical Society of America, 89(1):425-434, 1991.

Carterette, B. and Allan, J., "Incremental test collections," In Proceedings of the 14th ACM Int'l Conference on Information and Knowledge Management, pp. 680-687 . ACM, 2005.

Deng et al., "ImageNet: A large-scale hierarchical image database," In Computer Vision and Pattern Recognition (CVPR), IEEE Conference on, pp. 248-255. IEEE, 2009.

Ellis et al., "Echoprint: An open music identification service," In Proceedings of the 12th International Society for Music Information Retrieval Conference (ISMIR). ISMIR, 2011.

Hamel et al., "Temporal pooling and multiscale learning for automatic annotation and ranking of music audio," In Proceedings of the 12th Int'l Society for Music Information Retrieval Conference (ISMIR), pp. 729-734, 2011.

Humphrey, E. and Bello, J., "Rethinking automatic chord recognition with convolutional neural networks," In Int'l Conference on Machine Learning and Applications (ICMLA), vol. 2, pp. 357-362. IEEE, 2012.

Leglaive et al., "Singing voice detection with deep recurrent neural networks," In International Conference on Acoustics, Speech and Signal Processing (ICASSP), pp. 121-125. IEEE, 2015.

Mauch, M. and Dixon, S. "pYIN: A fundamental frequency estimator using probabilistic threshold distributions," In Int'l Conference on Acoustics, Speech and Signal Processing (ICASSP), pp. 659-663. IEEE, 2014.

Mauch et al., "Timbre and melody features for the recognition of vocal activity and instrumental solos in polyphonic music," In Proceedings of the 12th Int'l Society for Music Information Retrieval Conference (ISMIR), pp. 233-238, 2011.

Raffel, C. and Ellis, D., "Large-scale content-based matching of MIDI and audio files," In Proceedings of the 16th Int'l Society for Music Information Retrieval Conference (ISMIR). ISMIR, 2015.

Rafii, Z. and Pardo, B., "Repeating pattern extraction technique (REPET): A simple method for music/voice separation," IEEE Transactions on Audio, Speech, and Language Processing, 21(1):73-84, 2013.

Ramona et al., "Vocal detection in music with support vector machines," In Int'l Conference on Acoustics, Speech and Signal Processing (ICASSP), pp. 1885-1888. IEEE, 2008.

Regnier, L. and Peeters, G., "Singing voice detection in music tracks using direct voice vibrato detection," In Int'l Conference on Acoustics, Speech and Signal Processing (ICASSP), pp. 1685-1688. IEEE, 2009.

Schluter, J., "Learning to pinpoint singing voice from weakly labeled examples," In Proceedings of the 17th Int'l Society or Music Information Retrieval Conference (ISMIR), 2016.

Simpson et al., "Deep Karaoke: Extracting vocals from musical mixtures using a convolutional deep neural network," In Latent Variable Analysis and Signal Separation, Int'l Conference on, pp. 429-436. Springer, 2015.

Zwillinger, D. and Kokoska, S. (eds.). "Probability and Statistics Tables and Formulae," Chapman & Hall, New York, NY, 2000.

Badrinarayan et al. "Segnet: A deep convolutional encoder-decoder architecture for scene segmentation." IEEE Transactions on Pattern Analysis and Machine Intelligence, 2016.

Bansal et al. "Pixelnet: To-wards a general pixel-level architecture." arXiv preprint arXiv:1609.06694, 2016.

Brown. "Karaoke Idols: Popular Music and the Performance of Identity." Intellect Books, 2015, pp. 37-38.

Chan et al. "Vocal activity informed singing voice separation with the iKala dataset." Acoustics, Speech and Signal Processing (ICASSP), 2015 IEEE International Conference on, pp. 718-722. IEEE, 2015.

(56) References Cited

OTHER PUBLICATIONS

Chandra et al. "Monoaural audio source separation using deep convolutional neural networks." International Conference on Latent Variable Analysis and Signal Separation, pp. 258-266. Springer, 2017.
Emiya et al. "Subjective and objective quality assessment of audio source separation." IEEE Transactions on Audio, Speech, and Language Processing, 19(7):2046-2057, 2011.
Goodfellow et al. "Deep learning." vol. 1. Cambridge: MIT press, 2016. Chapter 9: Convolutional Neural Networks.
Grais et al. "Single channel audio source separation using convolutional denoising autoencoders." arXiv preprint arXiv:1703.08019, 2017.
Griffin et al. "Signal estimation from modified short-time Fourier transform." IEEE Transactions on Acoustics, Speech, and Signal Processing 32.2 (1984): 236-243.
Huang et al. "Singing-voice separation from monaural recordings using deep recurrent neural net-works." Proceedings of the 15th International Society for Music Information Retrieval Conference, IS-MIR 2014, Taipei, Taiwan, Oct. 27-31, 2014, pp. 477-482, 2014.
Humphrey et al. "Mining labeled data from web-scale collections for vocal activity detection in music." Proceedings of the 18th ISMIR Conference, 2017.
Isola et al. "Image-to-image translation with conditional adversarial networks" arXiv preprint arXiv:1611.07004, 2016.
Jannson et al. " Singing Voice Separation With Deep U-Net Convolutional Networks." 18th International Society for Music Information Retrieval Conference, Suzhou, China, 2017. Reference [37] is incorporated by reference herein in its entirety, as if set forth fully herein.
Kingma et al. "A method for stochastic optimization." arXiv preprint arXiv:1412.6980, 2014.
Likert. "A technique for the measurement of attitudes." Archives of psychology, 1932.
Long et al. "Fully convolutional networks for semantic segmentation." Proceedings of the IEEE Conference on Computer Vision and Pattern Recognition, pp. 3431-3440, 2015.
Luo et al. "Deep clustering and conventional networks for music separation: Stronger together." arXiv preprint arXiv:1611.06265, 2016.
Luo et al."Deep clustering for singing voice separation." 2010. http://creativecommons.org/licenses/by-nc-sa/3.0/.
Mesaros et al. "Automatic recognition of lyrics in singing." EURASIP Journal on Audio, Speech, and Music Processing, 2010(1):546047, 2010.
Mesaros et al. "Singer identification in polyphonic music using vocal separation and pattern recognition methods." Proceedings of the 8th International Conference on Music Information Retrieval, ISMIR 2007, Vienna, Austria, Sep. 23-27, 2007, pp. 375-378, 2007.
Noh et al. "Learning deconvolution network for semantic segmentation." Proceedings of the IEEE International Conference on Computer Vision, pp. 1520-1528, 2015.

Orio et al. "Music retrieval: a tutorial and re-view." Foundations and Trends R in Information Retrieval, 1(1):1-90, 2006.
Ozerov et al."Adaptation of bayesian models for single-channel source separation and its application to voice/music separation in popular songs." IEEE Transactions on Audio, Speech, and Language Processing, 15(5):1564-1578, 2007.
Raffel et al. "A transparent implementation of com-mon MIR metrics." Proceedings of the 15th International Society for Music Information Retrieval Conference, ISMIR 2014, Taipei, Taiwan, Oct. 27-31, 2014, pp. 367-372, 2014.
Rafii et al. "Repeating pattern ex-traction technique (REPET): A simple method for music/voice separation." IEEE transactions on audio, speech, and language processing, 21(1):73-84, 2013.
Ronneberger et al. "U-net: Convolutional networks for biomedical image segmentation." International Conference on Medical Image Computing and Computer-Assisted Intervention, pp. 234-241. Springer, 2015.
Rosenblatt "The perceptron: A probabilistic model for information storage and organization in the brain." Psychological review, vol. 65, No. 6, pp. 386-408.
Schulter et al. "Musical onset detection with convolutional neural networks." 6th International Workshop on Machine Learning and Music (MML), Prague, Czech Republic. 2013.
Simpson et al."Deep karaoke: Extracting vocals from musical mixtures using a convolutional deep neural net-work." International Conference on Latent Variable Analysis and Signal Separation, pp. 429-436. Springer, 2015.
Smaragdis et al. "Static and dynamic source separation using nonnegative factorizations: A unified view." IEEE Signal Processing Magazine, 31(3):66-75, 2014.
Tagg. "Analysing popular music: theory, method and practice." Popular music, 2:37-67, 1982.
Thiede et al. "PEAQ—The ITU standard for objective measurement of perceived audio quality." Journal of the Audio Engineering Society, 48(1/2):3-29, 2000.
Tzanetakis et al. "Musical genre classification of audio signals." IEEE Transactions on speech and audio processing, 10(5):293-302, 2002.
Vembu et al. "Separation of vocals from polyphonic audio recordings" ISMIR 2005, 6th International Conference on Music Information Retrieval, London, UK, Sep. 11-15, 2005, Proceedings, pp. 337-344, 2005.
Vincent et al. "Performance measurement in blind audio source separation." IEEE transactions on audio, speech, and language processing, 14(4):1462-1469, 2006.
Virtanen. "Monaural sound source separation by nonnegative matrix factorization with temporal continuity and sparseness criteria." IEEE transactions on audio, speech, and language processing, 15(3):1066-1074, 2007.
Zhang et al. "Colorful image colorization." European Conference on Computer Vision, pp. 649-666. Springer, 2016.

* cited by examiner

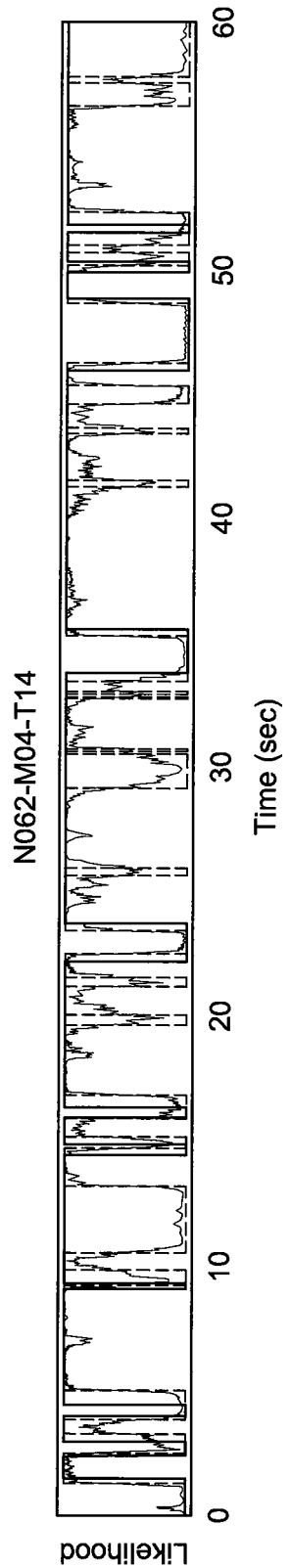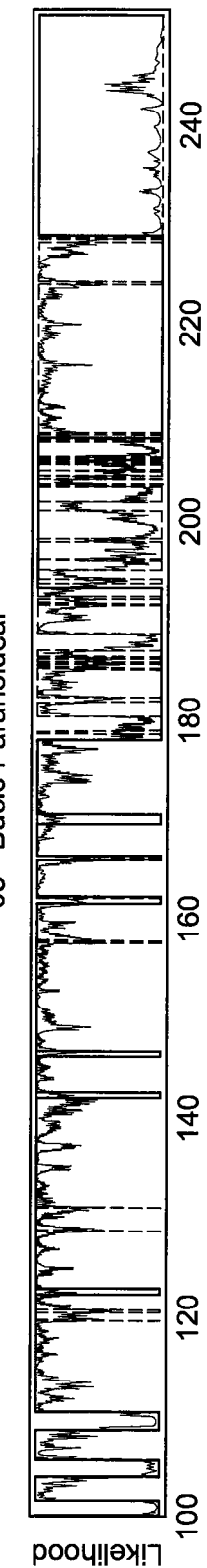
FIG. 9A
FIG. 9B

EXTRACTING SIGNALS FROM PAIRED RECORDINGS

CROSS-REFERENCE TO RELATED APPLICATION

This application claims priority under 35 U.S.C. 119(e) to U.S. Provisional Application No. 62/540,835, filed Aug. 3, 2017, the contents of which are incorporated herein by reference, as if set forth fully herein.

BACKGROUND

A number of publications, identified as References [1] to [18], are listed in a section entitled "REFERENCES" located at the end of the DETAILED DESCRIPTION herein. Those References will be referred to throughout this application.

In recent years, the ubiquity of cheap computational power and high quality open-source machine learning software toolkits has grown considerably. This trend underscores the fact that attaining state-of-the-art solutions via machine learning increasingly depends more on the availability of large quantities of data than the sophistication of the approach itself. Thus, when tackling less traditional or altogether novel problems, machine learning practitioners often choose between two paths to acquiring data: manually create (or curate) a dataset, or attempt to leverage existing resources.

Both approaches present unique challenges. Manual curation is necessary when precise information is required or insufficient data are available, but can be quite time-consuming and financially expensive. Alternatively, "mining" data, i.e., recovering useful information that occurs serendipitously in different contexts, can result in massive, web-scale datasets with far less effort, e.g., recovering labels from the text around an image. While these signals are typically generated as a by-product of other, pre-existing (human) behaviors and prone to both noise and bias, recent machine learning research has managed to use this approach to great effect. See, e.g., Reference [5].

With the continued growth of digital music services, vocal activity detection (VAD) is a task of increasing importance that has enjoyed far less attention than other topics in machine perception. Analogous to face detection in computer vision, a goal of VAD is to pinpoint the time intervals in a music recording that contain singing. Robust VAD is a key foundational technology that could power or simplify a number of end-user applications that remain open research topics, such as vocalist similarity, music recommendation, artist identification, or lyrics transcription. Despite a modest research tradition, the state of the art continues to advance with diminishing returns, rendering VAD an unsolved problem with considerable potential.

Given the dominance of data-driven methods in machine learning, it stands to reason that data scarcity may be contributing to the apparent ceiling in the performance of VAD algorithms. As detailed in Table 1, which shows evolution of a dataset size, limited progress has been made toward increasing the size of labeled datasets, limiting the efficacy of modern approaches, e.g., deep learning, to VAD research. In that Table, UL represents unlabeled data, WL represents weakly labeled data (e.g., where one label is employed for a whole sequence), and SL represents strongly labeled data (e.g., where each instance of a sequence is labeled).

TABLE 1

| Work | Training Dataset |
| --- | --- |
| (Reference [1]) | 101 FL clips (15 s) |
| (Reference [14]) | 93 SL tracks |
| (Reference [15]) | 93 SL tracks |
| (Reference [11]) | 100 SL tracks |
| (Reference [13]) | 1k UL, 14 SL tracks |
| (Reference [16]) | 10k WL clips (30 sec) |

One previous effort cleverly attempts to side-step this limitation by making use of different, indirect sources of information (see Reference [13]). The underlying assumption is that most popular music consists of "an underlying repeating structure over which varying elements are superimposed", which allows a repeating background to be distinguished from a non-repeating foreground. As a result, the authors of Reference [13] were able to achieve purportedly encouraging results utilizing only 1000 songs for training their model. More recent research succeeded in curating a dataset of 10 k, 30 second weakly labeled clips (either "completely instrumental" or "containing singing voice"), using this dataset to train a convolutional neural network (see Reference [16]). Iterative boosting is then used to train successively better models, eventually achieving state of the art performance. VAD research has largely attempted to source its data through manual curation, but this approach struggles to scale. This begs an obvious question as to whether it is possible to instead mine a collection of labeled data for VAD.

Machine learning algorithms can require a lot of data for training. Often, this process is performed manually by humans, referred to as labeling or annotation, and can be especially time consuming, difficult, or both.

Traditional attempts extracted information from single inputs only, such as by way of artificial intelligent systems. Traditionally, information about a signal is contained only in that signal, rather than leveraging one or more related signals to recover information about one of interest.

Prior work in paired input systems mostly focused on computing a similarity measure between songs (e.g., how similar are these two songs?). These systems were under the categories of cover song recognition or music similarity.

Reference [1] uses an acoustic classifier of a speech recognizer as a detector for speech-like sounds to feed an Artificial Neural Network trained on a speech dataset (NIST Broadcast News), while Reference [15] attempts to explicitly exploit vibrato and tremolo, two characteristics that are specific to vocal signals. A common class of approaches consists of creating a manually labeled training set, extracting audio features on short overlapping windows of each recording, and training a classifier to obtain a binary prediction for each frame, possibly followed by a post-processing smoothing step to minimize artifacts in the final prediction curve. In Reference [14], Support Vector Machines (SVMs) are used for frame classification and Hidden Markov Models act as a smoothing step. A similar solution is proposed by Reference [11], which exploits a wider set of features, including ones derived from a predominant melody extraction step.

More recently, increasingly complex classifiers are preferred to feature engineering, given the widespread success of deep learning methods and modest increases in available training data. There is prior research that explores the application of deep learning to music tagging, which typically encompasses one or more classes for singing voice in the taxonomy considered (see Reference [7]). Elsewhere, deep networks have been used for pinpointing singing voice in source separation systems (see Reference [17]). Regarding the particular task at hand, Reference [9] proposes a sophisticated architecture based on Recurrent Neural Networks that does not have a separate smoothing step, while Reference [16] uses a conventional convolutional network topology.

It is with respect to these and other general considerations that embodiments have been described. Also, although relatively specific problems have been discussed, it should be understood that the embodiments should not be limited to solving the specific problems identified in the background.

SUMMARY

The foregoing and other limitations are overcome by a system, method and computer product for extracting an activity from recordings. The method comprises searching for signals representing plural versions of a track, determining feature representations of the plural versions of the track identified in the searching, aligning the feature representations determined in the determining, and extracting a time varying activity signal from the feature representations aligned in the aligning.

The time varying activity signal is a vocal activity signal, one of the plural versions of the track is an instrumental track, and another one of the plural versions of the track is a non-instrumental track.

According to one example embodiment herein, the searching includes identifying a first track among the plural versions of the track as the instrumental track and a second track among the plural versions of the track as the non-instrumental track. Also in this embodiment, the identifying includes determining at least one of:
(i) that the first and second tracks are recorded by a same artist,
(ii) that a title of at least one of the first and second tracks does not include predetermined information,
(iii) that titles of the first and second tracks substantially match, and
(iv) that durations of the first and second tracks differ by no more than a predetermined length of time.

According to an example embodiment herein, the determining includes determining a Time-Frequency Representation (TFR) of the plural versions of the track identified in the searching, the TFR is a Constant-Q Transform representation, and the aligning includes Dynamic Time Warping (DTW). Also, the extracting can include determining a residual based on the feature representations aligned in the aligning, such as by, for example, determining an amplitude of a time-frequency path defining the time varying activity signal.

In a further example embodiment herein, the method further comprises removing suspect signals from the plural versions of the track searched in the searching. Additionally, the suspect signals can be detected by determining that at least two of the signals representing plural versions of the track overlap to a first predetermined extent, or do not overlap to a second predetermined extent.

BRIEF DESCRIPTION OF THE DRAWINGS

FIG. 9a represents an example from an evaluation dataset, showing ground truth, estimated likelihoods, and thresholded prediction over time.

FIG. 9b represents another example from an evaluation dataset, showing ground truth, estimated likelihoods, and thresholded prediction over time.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present technology exploits to advantage a huge, untapped resource in modern music: the "instrumental version", i.e., a song in which the vocals have been omitted. According to one example aspect herein, the technology involves mining original-instrumental pairs from a massive catalogue of music content, extracting strong vocal activity signals between corresponding tracks, exploiting this signal to train deep neural networks to detect singing voice, and recognizing the effects of this data source on the resulting models.

Data Generation

A description will now be made of the formation of candidate recording pairs, an algorithm for automatically estimating vocal activity from each, and how a vocal activity signal is used for training, according to example embodiments herein. In Western popular music, a song's arrangement often revolves around a lead vocalist, accompanied by instruments such as guitar, drums, bass, piano, etc. It is not uncommon for an artist to also release an "instrumental" version of the same song (to be used for, e.g., remixes or karaoke), in which the primary difference between it and the corresponding "original" recording is the absence of vocals (although other differences in signal characteristics may occur as well owing to, e.g., production effects, such as mastering, compression, equalization, etc.). In principle, the difference between these two sound recordings should be highly correlated with vocal activity, which would provide a fine-grained signal for training machine learning models. However, to exploit this property at scale, an example aspect of the present application can identify and align pairs of original recordings and matching instrumental versions automatically. In one example embodiment herein, a multi-step approach is employed to mine strongly labeled singing voice information from a large music collection, wherein the steps generally include identification of original-instrumental pairs from metadata, estimating a vocal activity signal from each pair of recordings, and performing data sampling as a function of estimated vocal activity.

Selection of Matching Recordings

Figures 1, 2:
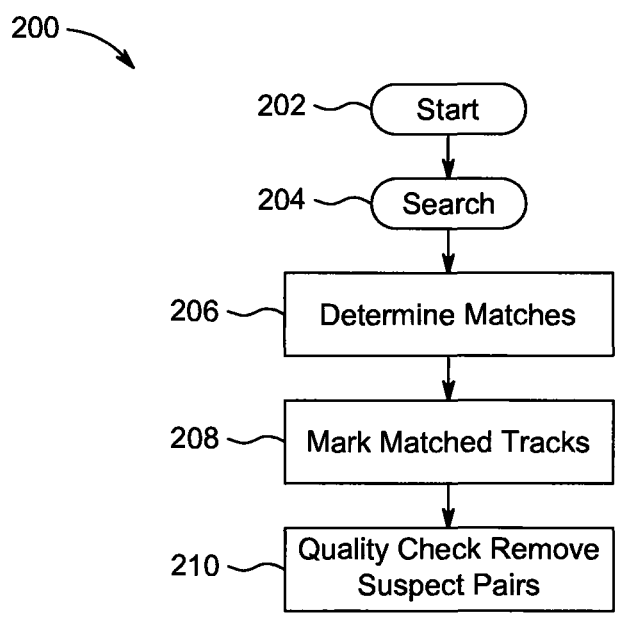
FIG. 1 shows an example of a table that can be employed to implement an example aspect herein, wherein the table includes metadata associated with tracks.
FIG. 2 is a flow diagram of a procedure for identifying matching tracks, according to an example aspect herein.

The manner in which candidate recording pairs are formed using a method according to an example aspect herein will now be described, with reference to the flow diagram of FIG. 2. The method 200 commences at step 202. According to one example embodiment herein, in step 204 a search is performed based on a set of tracks (e.g., a set of ten million commercially recorded tracks) stored in one or more databases to determine tracks that match (step 206), such as one or more matching pairs of tracks (A, B). Each track may include, for example, information representing instrumental and vocal activity (if any), and an associated string of metadata which can be arranged in a table of a database. For example, as shown in the example table depicted in FIG. 1, the metadata for each track (e.g., track1, track2 . . . track-n) can include various types of identifying information, such as, by example and without limitation, the track title 100, artist name 102, track duration 104, the track type 106 (e.g., whether the track is "instrumental" or "original", arranged by columns in the table. In one example embodiment herein, step 204 includes evaluating the metadata for each track to match (in step 206) all tracks that meet predetermined criteria. For example, in the example embodiment herein, the matching of step 206 is performed based on the metadata identifying information (i.e., track titles, artist names, track durations etc.) about the tracks, to match and identify all tracks (A, B) determined to meet the following criteria:

tracks A and B are recorded by a same artist;

the term "instrumental" does not appear in the title (or type) of track A;

the term "instrumental" does appear in the title (or type) of track B;

the titles of tracks A and B are fuzzy matches; and the track durations of tracks A and B differ by less than a predetermined time value (e.g., 10 seconds).

According to one example embodiment herein, the fuzzy matching is performed on track titles by first formatting them to a standardized format, by, for example, latinizing non-ASCII characters, removing parenthesized text, and then converting the result to lower-case text. In one example, this process yields about 164 k instrumental tracks, although this example is non-limiting. Also in one example embodiment herein, the method may provide a 1:n, n:n, or many-to-many mapping, in that an original song version may match to several different instrumentals in step 206, and vice versa. Thus, although described herein in terms of an example case where tracks A and B can be matched, the invention is not so limited, and it is within the scope of the invention for more than two tracks to be matched together in step 206, and for more than two or a series of tracks to be matched in step 206. For example, multiple pairs or multiples series of tracks can be matched in that step.

In step 208, matching versions of a track, such as a pair of tracks (A, B) that were matched in step 206, are marked or otherwise designated (e.g., in a memory) as being either "instrumental" or "original", based on whether or not the term "instrument" appears in the metadata associated with those tracks. In the present example wherein the metadata of track A does not indicate that it is an instrumental, and where the metadata of track B does indicate that track B is an instrumental, then the matching tracks (A, B) are marked as "(original, instrumental)".

In one example embodiment herein, at least some of the results of step 206 can be evaluated manually (or automatically) to check for quality in step 210, since it may occur that some tracks were matched that should not have been matched. In general, such undesired matching can be a result of one or more errors, such as, for example, instrumental tracks appearing on multiple albums (such as compilations or movie soundtracks, where the explicit description of the track as "instrumental" may be warranted by the context). Pairs that are suspected of being incorrectly matched can be identified using a procedure according to an example aspect herein. For example an audio fingerprinting algorithm can be used to remove suspect pairs from the candidate set. In one example embodiment, that step is performed using an open-source fingerprinting algorithm, and the procedure described in Reference [6], can be employed although in other embodiments other types of algorithms can be employed. Reference [6] is hereby incorporated by reference in its entirety, as if set forth fully herein.

Figure 3:
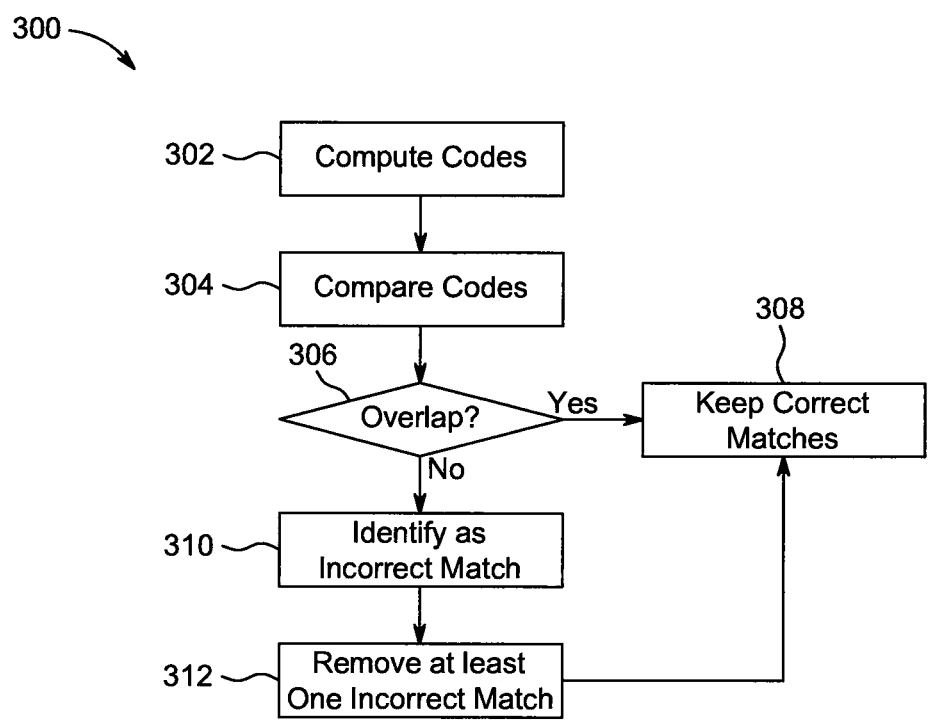
FIG. 3 is a flow diagram of a procedure for performing a quality check to identify incorrectly matches tracks, and further represents a step 210 of FIG. 2.

In one example embodiment, step 210 is performed according to procedure 300 illustrated in FIG. 3. Referring now to FIG. 3, for each matched track A and B a code sequence is computed using, in one example, a fingerprinting algorithm (step 302). Any suitable type of known fingerprinting algorithm for generating a code sequence based on a track can be employed. Next, in step 304 the code sequences for the respective, matched tracks A and B are compared using, in one example embodiment herein, a Jaccard similarity. If sequences are determined based on the Jaccard similarity to overlap within a predetermined range of acceptability ("Yes" in step 306), then the corresponding tracks are identified as being correctly matched in step 308. The predetermined range of acceptability can be defined by upper and lower boundaries of acceptability.

If, on the other hand, the comparison performed in step 304 results in a determination that the code sequences do not overlap within the predetermined range of acceptability ("No" in step 306), then in step 310 the tracks are determined to be matched incorrectly, and thus at least one of them is removed from the results (step 312), and only those that remain are deemed to be correctly matched (step 308). A determination of "No" in step 306 may be a result of, for example, the codes not overlapping enough (e.g., owing to an erroneous fuzzy metadata match), or the codes overlapping too much (i.e., beyond the predetermined range of acceptability), which may occur in cases where, for example, the tracks are identical (e.g., the tracks are both instrumental or both vocal).

The performance of step 312 may result in the removal of both tracks A and B, in certain situations. However, in the case for a 1:n, n:n, or many-to-many matching in earlier step 206, then only those tracks B which were determined to be matched with track A incorrectly are removed in step 312. In one example embodiment herein, step 312 is performed so that each original track is linked to only one non-redundant, instrumental track. The result of the performance of step 312 in that embodiment is that only pair(s) of tracks A, B deemed to match within the predetermined range of acceptability remain (step 308).

In a sample case where 10 million commercially available tracks are evaluated using the procedures 200 and 300, the processes yielded roughly 24,000 tracks, or 12,000 original-instrumental pairs, totaling about 1500 hours of audio track durations. 24,000 strongly labeled tracks were obtained for use as a training dataset, which is substantially more than the numbers shown in Table 1 of the Background section above.

Estimation of Vocal Activity

Figure 4:
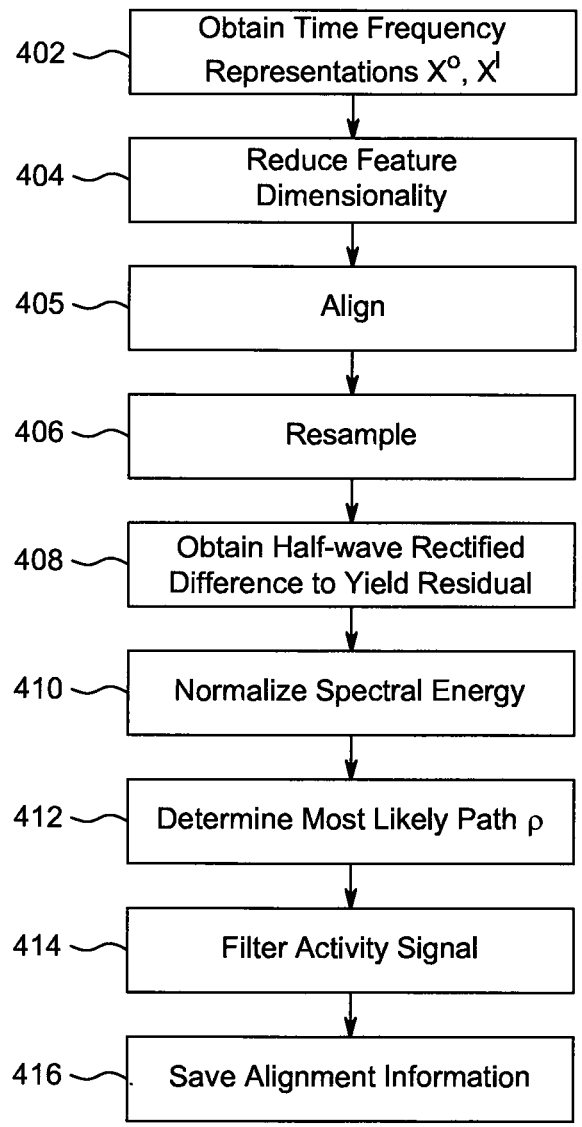
FIG. 4 is a flow diagram of a procedure for estimating vocal activity and determining alignment parameters for use in training, according to an example aspect herein.

The manner in which vocal activity can be estimated according to an example aspect herein will now be described, with reference to the flow diagram of FIG. 4, which represents a procedure 400 for estimating vocal activity. For purposes of the following description, $T^O$ and $T^I$ are employed to further denote tracks, in particular, "original" track A and "instrumental" track B, respectively, that were identified as being remaining correct matches in step 308. Generally, vocal activity estimation according to the present example aspect of the present application includes computing a Time-Frequency Representation (TFR) for each of the matching tracks $T^O$ and $T^I$ obtained from step 308, to yield corresponding TFRs $X^O$ and $X^I$, respectively, in the frequency domain (step 402), and then performing steps for transforming the TFRs and aligning them to estimate sections of vocal activity, as will be described below. Procedure 400 yields various types of alignment information, as described below, that can be used for training.

Time Frequency Representation

According to an example embodiment herein, a Constant-Q Transform (CQT) is employed for computing the TFRs $X^O$ and $X^I$ in step 402, owing to its complementary relationship between convolutional neural networks and music audio. Also in one example embodiment herein, the type of CQT employed is the same as that described in, for example, Reference [3], which is incorporated by reference herein in its entirety, as if set forth fully herein. Known for its use in association with deep learning research on music, the CQT uses a logarithmic frequency scale that linearizes pitch, allowing networks to learn pitch-invariant features as a result (see, e.g., Reference [8]). The frequency range of the transform is constrained to the human vocal range, i.e., E2-E7 (5 octaves, spanning 82.4-2637 Hz), and a moderately high resolution is employed, with 36 bins per octave and 32 frames per second. Logarithmic compression is applied pointwise to the TFR, although in other embodiments signal-dependent compression, such as automatic gain control or contrast normalization, can be employed.

Alignment

The manner in which signal alignment is performed will now be described, according to one example embodiment herein. As a first step 404 of the alignment, the pair of TFRs ($X^O$, $X^I$) obtained in step 402 undergoes a feature dimensionality reduction via, in one example, Principal Component Analysis, to produce corresponding components ($Z^O$, $Z^I$), wherein if $X^O$ is a shape [L, k] (where L represents a number of time steps and k is a number of frequency coefficients), $Z^O$ is shaped [L, n] (where n is the number of components, where generally n<<k). The Principal Components of each pair of tracks are computed preferably independently of the overall dataset. The components ($Z^O$, $Z^I$) are time varying components, wherein, Principal Component Analysis is an orthogonal linear transformation for transforming data to a different coordinate system, wherein a greatest variance by some projection of the data is on a first coordinate (first principal component), a second greatest variance is on a second coordinate, and so on. In the present example embodiment, Preferably, k=20 principal components are employed based on empirical results, although this example is non-limiting. Step 404 not only provides an increase in computational efficiency in subsequent processing steps, but also affords a useful degree of invariance because of the lower feature dimensionality obtained.

The components ($Z^O$, $Z^I$) are then aligned in step 405 using, in one example embodiment herein, Dynamic Time Warping (DTW) with a cosine distance function, resulting in the generation of two sequences, $n^O$, $n^I$, of indices, over the original and instrumental tracks (A, B), respectively. In one example embodiment herein, the aligning of step 405 is performed in accordance with the aligning technique described in Reference [12], which is incorporated by reference herein, although in other embodiments other aligning procedures can be employed. The aligning of step 405 enables the recovery of points in time from both a full and instrumental mix where the background musical content is roughly identical.

The TFRs ($X^O$, $X^I$) are then resampled to equivalent shapes in step 406, based on the indices $n^O$, $n^I$ (e.g., in one embodiment this is performed by nearest neighbor interpolation, although other coefficient-wise methods can be employed such as linear, bilinear, cubic, low-pass filtering, etc.), and the half-wave rectified difference is taken between the log-magnitude spectra, using the following formula (1), to yield the following residual (step 408):

$$\delta_{j,k} = \max\left(0, \log\left|X^O_{n^O_{j,k}} + 1\right| - \log\left|X^I_{n^I_{j,k}} + 1\right|\right) \quad \text{Formula (1)}$$

where j and k represent indices in a two-dimensional matrix, such as a row-column indexing in a table, j represents time, and k represents frequency.

Ideally, any difference determined in step 408 is presumed to be attributable entirely to vocals, and thus the residual is deemed to represent the vocal CQT spectra, and behaves like a smooth contour through successive time-frequency bins. Nonetheless, in practice, however, there may be other sources of residual energy, such as suboptimal alignment or production effects. To characterize contour-like residuals, the spectral energy (i.e., residual) obtained from the performance of step 408 is normalized in each time frame (step 410) and, in one example embodiment herein, a Viterbi algorithm preferably is applied in step 412 to the result of step 410 to decode the most likely path (p) through the residual spectra. Viterbi decoding enables the tracking of a fundamental frequency in a time-frequency activation map. In one example embodiment herein, step 412 is performed according to the technique described in Reference [10], which is incorporated by reference herein. Empirically, this process is far more robust to residual noise than simpler aggregation schemes, such as summing energy over frequency.

The amplitude of the time-frequency path, ρ, obtained in step 412, defines the vocal residual, or, optimistically, activity signal, φ, which approximates the energy of the vocal signal in isolation, over time (i.e., a time-varying vocal activity signal). As an additional step 414, the activity signal φ is filtered with a normalized Hanning window (where L=15, in one example), in order to both smooth the activity signal and expand it to encompass vocal onsets and offsets.

Figure 5A:
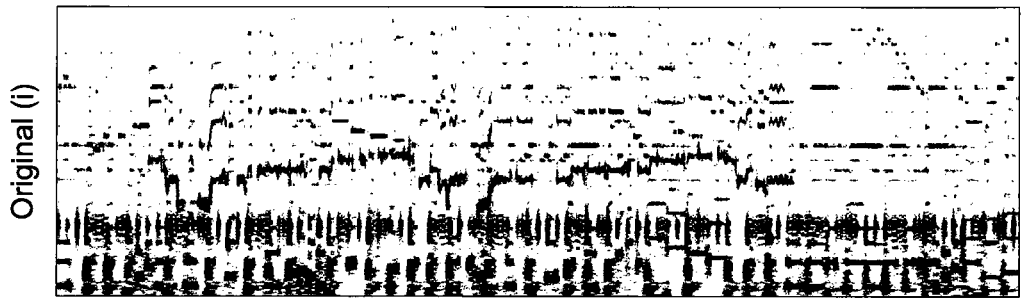
FIG. 5a represents an example of spectra of aligned original and instrumental tracks.
Figure 5B:
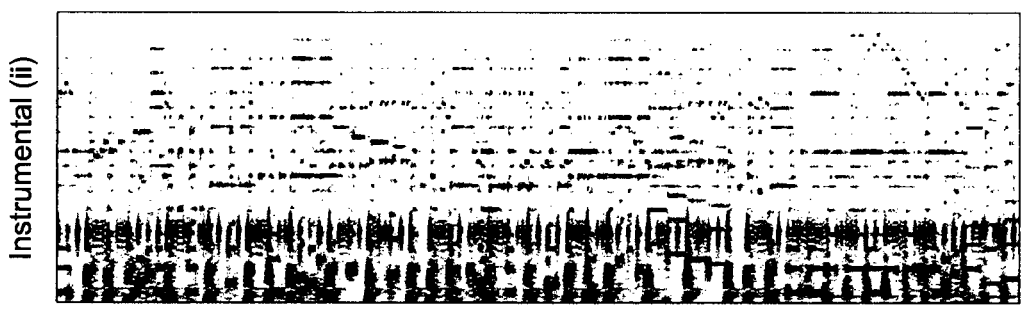
FIG. 5b represents another example of spectra of aligned original and instrumental tracks.
Figure 5C:
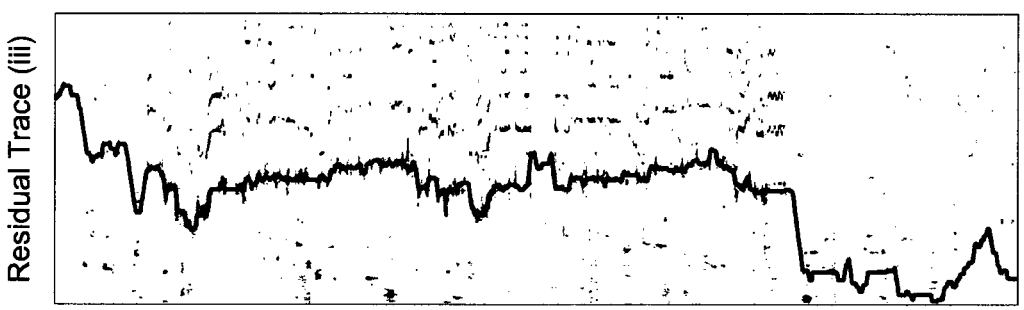
FIG. 5c represents an example of a residual with a trace of its fundamental.
Figure 5D:
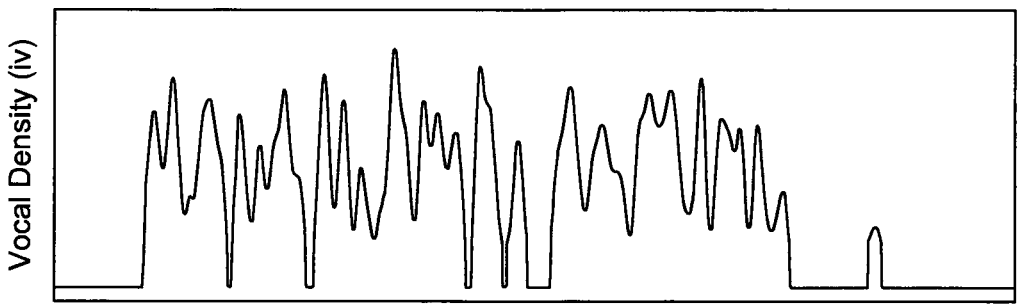
FIG. 5d represents an example of an activity signal.

FIGS. 5a and 5b represent examples of the CQT spectra of the aligned original and instrumental tracks, respectively (i.e., resulting from step 405), FIG. 5c represents an example of the residual with a trace of its fundamental (i.e., resulting from step 408), and FIG. 5d represents an example of the activity signal, φ (i.e., obtained from step 412). Alignment information ($n^O$, $n^I$, φ) and frequency path, ρ obtained in the procedure of FIG. 4 are saved in step 416 for use during training.

Sampling of Positive and Negative Observations

The time-varying vocal activity signal φ gives an indication of whether vocals are present at given instants of time, wherein higher values of the signal generally indicating more likely vocal activity than lower values of the signal. Relative values of the signal, however, may not always be necessarily meaningful, as they can be subject to noise. Thus, according to an example aspect herein, learning is framed as a classification task, and distributions can be built over each track, from which windowed observations can be discerned. This approach can be understood as distributing potential labeling errors over two discrete classes rather than a continuous variable, thereby helping to preserve a better signal-to-noise ratio.

Figure 6:
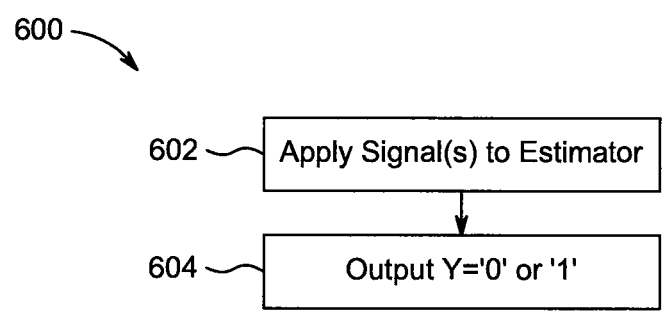
FIG. 6 is a flow diagram of a procedure for sampling positive and negative observations, according to an example embodiment herein.
Figure 7:
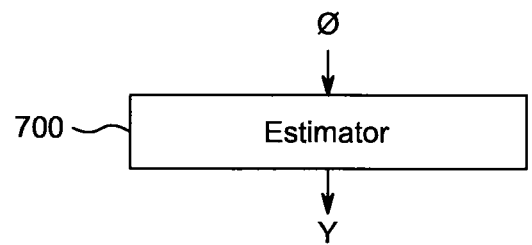
FIG. 7 shows an example estimator used in the procedure of FIG. 6, according to an example embodiment herein.

A procedure 600 for sampling positive and negative observations according to an example embodiment herein will now be described, with reference to FIG. 6, which illustrates a flow diagram of the procedure 600, and also with reference to FIG. 7, which shows an estimator (also referred to as a "classifier" or "machine learning model") 700 according to an example embodiment herein. The estimator 700, in one example embodiment, is fed with short time fragments of the signal φ, and the estimator 700 assigns each observation to either a vocal or a non-vocal class. The estimator 700 preferably has a known bias, and the signal φ is employed to train the estimator 700, such that the estimator 700 outputs a value Y that equals "1" in a case where the signal φ includes vocal activity, or a value Y that equals "0" in a case where the signal φ does not include vocal activity. That is, the estimator 700 with a known (uniform) bias is trained in by sampling positive (Y=1) and negative (Y=0) observations from original and instrumental tracks, respectively, with equal frequency. That is, samples of the signal φ are applied to the estimator 700 (step 402), which responds by outputs (in step 604) a value Y that equals either '1' or '0', wherein negative (Y=0) time fragments of the signal Negative observations are drawn uniformly from instrumental tracks, while positive observations are sampled proportionally to the vocal activity signal φ. To explore how this signal influences training, two parameters are introduced, a threshold τ and a compression factor ϵ, in the following probability function (2):

$$Pr(X_n^O | Y=1) \propto \begin{cases} \phi_n^\epsilon & \phi_n \geq \tau \\ 0 & \text{otherwise} \end{cases}$$

wherein:
$x^O$ represents the TFR for the original track,
represents the activity signal,
Y represents a classification label,
ϵ is a proportion label,
n represents a frame number,
τ represents the threshold, and
ϵ represents the compression factor.

The manner in which the variables influence the probability function (2) will now be described. Exponentials in the range of 0<ϵ<1 are considered interesting because they flatten the density function. Note that settings ϵ=0 and τ=0 correspond to uniform sampling over time, which is equivalent to weakly labeled data, i.e., one label is applied to all samples equally. Weakly labeled data can occur as a result of not knowing where voice is located in time in a sample.

Because original and instrumental recordings preferably are aligned in the course of computing a vocal activity signal, it is possible to draw correlated positive-negative pairs from both the original and instrumental tracks corresponding to the same point in time, a sampling condition referred to herein as entanglement, ζ∈{True, False}. These paired observations can be deemed to reside near a decision boundary, being near-neighbors in the input space but belonging to different classes, and training with entangled pairs may affect model behavior.

Example Architecture of Estimator 700

An example architecture of the estimator 700 according to one example embodiment herein will now be described. One or more TFRs, such as those obtained in step 402 described above are processed in 1 second windows, with a dimensionality of 32×180 bins (e.g., 1 second dimensionality) in time and frequency, respectively. The estimator 700 in this example embodiment is implemented as a five-layer neural network, with three (3D) convolutional layers, each followed by max-pooling, and two fully-connected layers, with the following parameter shapes: w0=(1, 64, 5, 13), p0=(2, 3), w1=(64, 32, 3, 9), p1=(2, 2), w2=(32, 24, 5, 1), p2=(2, 1), w3=(1540, 768), and w4=(768, 2). All layer activations are hard rectified linear units (ReLUs), with the exception of the last (classifier) layer, which uses a softmax. In one example, four-dimensional w parameters represent [input channels, a number of kernals, time, frequency], two-dimensional w parameters represent [a number of inputs, a number of outputs], and two-dimensional p parameters represent [time, frequency].

In one example embodiment herein, the network is trained using a negative log-likelihood loss function and parameters are optimized with minibatch stochastic gradient descent. In that example embodiment herein, the estimator 700 is implemented using Theano as a neural network library (https://github.com/Theano/Theano), leveraging a Pescador (https://github.com/pescadores/pescador) data sampling library for drawing samples from datasets, and training is accelerated with a NVIDIA Titan X GPU. Networks are trained for 500 k iterations (approximately 20 hours of single second observations) with a learning rate of 0.05, and a batch size of 50. Dropout is used in all but the last layer, with a parameter of 0.125. In addition to the weakly labeled case {ϵ=0.0, τ=0.0, ζ=F}, model behavior is explored over two sampling parameter settings, with and without entanglement: {ϵ=0.3, τ=0.05} and {ϵ=1.0, τ=0.2}.

These values are informed by first computing a histogram of vocal activation signals over the collection, revealing that a large number of values occur near zero (≤0.05), while the upper bound rolls off smoothly at ≈2.5. Thus, an intuition for the parameters can come from an analysis of the data.

Experimental Results

To assess the performance of models, two standard datasets were considered for vocal activity detection: the Jamendo collection, containing 93 manually annotated songs from the Jamendo music service (see Reference [14]); and the RWC-Pop collection, containing 100 manually annotated songs (see Reference [11]). An area under the curve (AUC) score and max-accuracy was considered. As described in Reference [16], the AUC score provides insight into the rank ordering of class likelihoods, and max-accuracy indicates the performance ceiling (or error floor) given an optimal threshold.

Quantitative Evaluation

Table 2 hereinbelow shows a summary of statistics obtained over the two datasets considered as a function of sampling parameters, alongside previously reported results for comparison from Reference [16] (Schluter). For example, Table 2 shows AUC scores and maximum accuracies across models on the RWC and Jamendo datasets. For context, the first three systems ($\alpha$, $\beta$, $\gamma$) are successive boosted versions of each other, i.e., $\alpha$ is trained with weak labels, and its predictions on the training set are used to train $\beta$, and so on; the fine model is trained directly with strongly labeled data. Each case is referred to below using a suffix, e.g., $\alpha$, $\beta$, $\gamma$.

There are some noticeable observations. First, it is confirmed that the approach in the present application toward mining training data produces models that, at the very least, match state of the art performance with far less human effort than in prior attempts. Configuration I represented in Table 2 and corresponding to the weak labeling condition, performs roughly on par with a comparably trained system, a, and validates previous results. Configuration V represented in Table 2 achieves the best scores of the example models described herein.

TABLE 2

| | | | RWC | | JAMENDO | |
|---|---|---|---|---|---|---|
| | | | AUC | ACC⁺ | AUC | ACC⁺ |
| SCHULTER-$\alpha$ | | | 0.879 | 0.856 | 0.913 | 0.865 |
| SCHULTER-$\beta$ | | | 0.890 | 0.861 | 0.923 | 0.875 |
| SCHULTER-$\gamma$ | | | 0.939 | 0.887 | 0.960 | 0.901 |
| SCHULTER-FINE | | | 0.947 | 0.882 | 0.951 | 0.880 |
| $\tau$ | $\epsilon$ | $\gamma$ | | | | |
| I | 0.0 | 0.0 | F | 0.891 | 0.856 | 0.911 | 0.856 |
| II | 0.05 | 0.3 | F | 0.918 | 0.879 | 0.925 | 0.869 |
| III | 0.05 | 0.3 | T | 0.918 | 0.879 | 0.934 | 0.874 |
| IV | 0.2 | 1.0 | F | 0.937 | 0.887 | 0.935 | 0.872 |
| V | 0.2 | 1.0 | T | 0.939 | 0.890 | 0.939 | 0.878 |

A notable difference between models is in the range of 0.02-0.05 across metrics, which is only reliable to some extent with datasets of this size. In terms of sampling parameters, it is observed that a direct correlation between signal-to-noise ratio in training data (i.e., the more non-vocal observations are discarded), the better the models behave on these measures. Training with entangled pairs ($\zeta$=T) also has at least some positive effect.

Figure 8A:
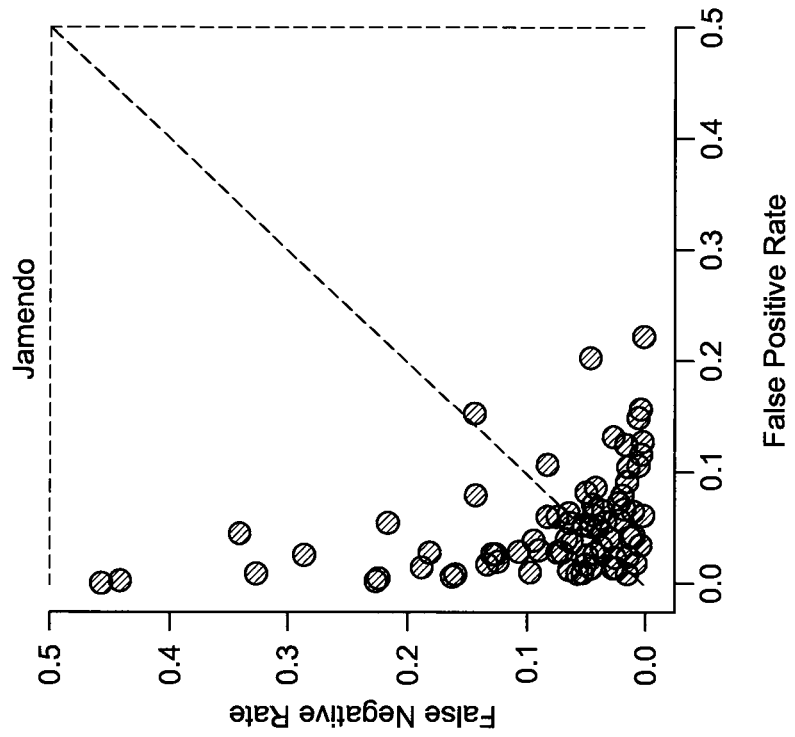
FIG. 8a depicts an example of trackwise error rates and plot false positives versus false negatives, based on a RWC dataset.
Figure 8B:
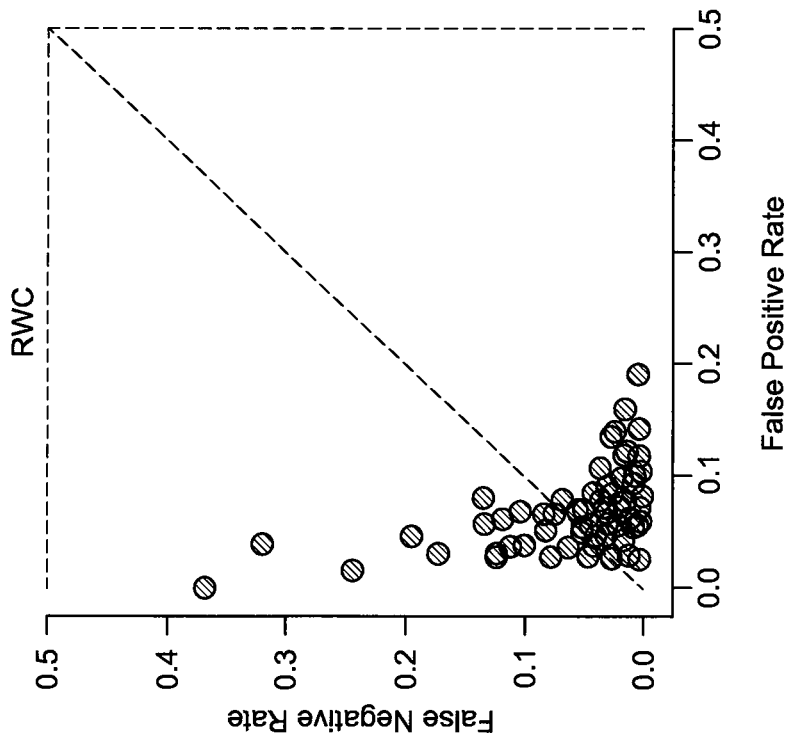
FIG. 8b depict examples of trackwise error rates and plot false positives versus false negatives, based on a Jamendo dataset.

FIGS. 8a and 8b depict trackwise error rates, and plot false positives versus false negatives for configuration IV, for the RWC dataset and the Jamendo dataset, respectively. One outlier (fn≈0.66) in the Jamendo set (FIG. 8b) is not shown to maintain aspect ratio.

Error Analysis

The example embodiments described herein are high performing, and thus an informative path to understanding model behavior is through analyzing errors. Considered in terms of binary classification, Type I errors (false positives) are likely to occur, if at all, when a different sound source is mistaken for voice, Type II errors (false negatives) are likely to occur, if at all, when the energy of a vocal source has fallen below the model's sensitivity. Observations drawn from a same music recording tend to be highly correlated, owing to the repetitive nature of music, and thus track-wise frequency of Type I/II errors are explored to identify behaviors that may reveal broader trends.

Referring again to FIGS. 8a and 8b, a slight corpus effect manifests between the RWC and Jamendo collections. In the former collection, the majority of the tracks commit Type-I errors, but at a much lower rate of occurrence (fp<0.1) than Type-II errors. Additionally, when errors do occur in a track, they tend to be primarily of one type, and seldom both. This is less the case for the Jamendo set, comprised of both "worse" tracks and a (slightly) larger co-occurrence of error types in a given track. There may be two possible sources of differences between collections: each was annotated by a different individual, and the musical content itself is different. The Jamendo collection consists of music from "real" artists with vocals in French and English, whereas the RWC collection consists of pop karaoke tunes performed by amateur vocalists in Japanese and English.

Using this visualization of trackwise errors, a consideration of various outliers yields some observations. FIGS. 9a and 9b represent examples from an evaluation dataset, showing ground truth, estimated likelihoods, and thresholded prediction over time. In FIG. 9a, a track from the RWC corpus demonstrates how a model's extreme temporal precision and out-perform a human annotator, a common source of false negatives.

There may be two primary sources of false negatives. Regarding one source, represented in FIG. 9a, trained models exhibit a level of temporal precision beyond the annotators' in either dataset, pinpointing breaths and pauses in otherwise continuous vocalizations. With respect to a second source, nuances of the data used for training seem to induce a production bias, whereby the model under-predicts singing voice in lower quality mixes. Models trained on professionally produced music might develop a sensitivity to mixing quality. A similar bias also appears to account for a majority of all false positives, which often correspond with monophonic instrumental melodies, e.g., guitar riffs or solos, but less so for polyphonic melodies, i.e., two or more notes played simultaneously by a same source.

FIG. 9b illustrates an example of this behavior. FIG. 9b represents a track from the Jamendo collection illustrating different challenges, including imposter sources (a guitar solo), sensitivity to vocal presence, and annotator error. In at least the first 80 seconds of the clip shown, the model accurately predicts human annotation. From the 210 second mark, the human annotation is wrong, but the example model herein is correct, since the period from 210-230 seconds indeed includes vocal activity, whereas the period from 230-252 seconds contains no voice; this error accounts for 16% of the track. A notable takeaway from this example is the importance of larger, diverse datasets for evaluation to encompass a variety of challenging signals and outweigh noise that may skew metrics.

Multitrack Analysis

The results confirm that it can be challenging to manually annotate singing voice activity with machine precision. Ideally, though, human annotation approximates a smoothed, thresholded version of the vocal signal energy in isolation, and, as such, it can be interesting to understand the degree to which model estimations of the example embodiments described herein correspond with a pure vocal signal. Another way of measuring the example models' capacity to estimate a singing voice from a "down-mixed" recording is via the use of multitrack audio, which provides direct access to a signal of interest, i.e., vocals, in isolation.

Consider a dataset of 122 song tracks (e.g., from MedleyDB) containing recordings of individual stems and corresponding mixes (see Reference [2]). For each of 47 songs that have vocals in isolation, a single vocal track is created for analysis, and the log-magnitude CQT is computed for the full mix (the "original" version) $X^M$, and the isolated vocals, $X^V$. Whereas previously Viterbi was used to track vocal activity, here the reference vocal energy signal contains no noise and can be computed by summing the energy over frequency, using formula (3)

$$E_n^V = \Sigma_k X_{n,k}^V$$

where the parameters n and k represent discrete time and frequency, respectively.

The trained models are applied to the full mix, $X^M$, for inference, producing a time-varying likelihood, $L^M$.

The reference energy signal is not a class label, but a continuous value, and the comparison metrics can be adjusted accordingly. Maximum accuracy is generalized to the case where independent thresholds are considered for $E^V$, $L^M$ over the dataset, providing insight into the best-case agreement between the two signals. Another consideration is the Spearman rank-order correlation between the two sets, a measure of the relative rank order between distributions, e.g., a high likelihood corresponds to a relatively high energy, and vice versa (see Reference [18]).

An exploration of model performance on this dataset confirms earlier observations, summarized in Table 3, which represents a Spearman rank-order correlation and maximum accuracy scores across models on the MedleyDB vocal subset.

TABLE 3

| | $\{\tau, \epsilon, \zeta\}$ | SPEARMAN-R | ACC+ |
|---|---|---|---|
| I | 0.0, 0.0, F | 0.681 | 0.812 |
| II | 0.05, 0.3, F | 0.779 | 0.849 |
| III | 0.05, 0.3, T | 0.768 | 0.854 |
| IV | 0.2, 1.0, F | 0.784 | 0.852 |
| V | 0.2, 1.0, T | 0.796 | 0.862 |

Figure 10A:
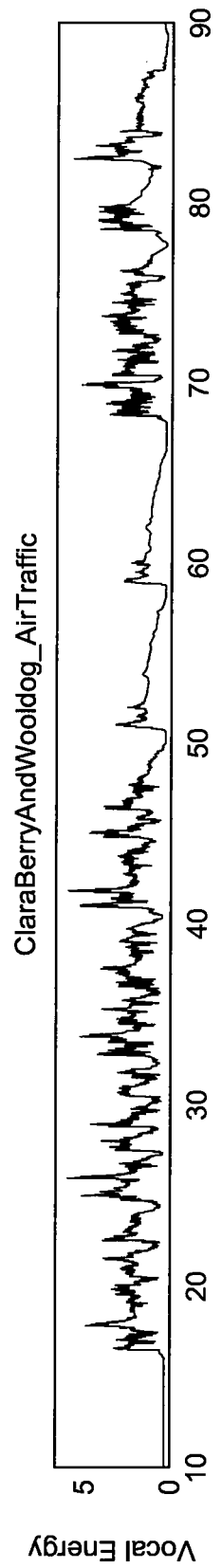
FIG. 10a shows an isolated vocal energy.
Figure 10B:
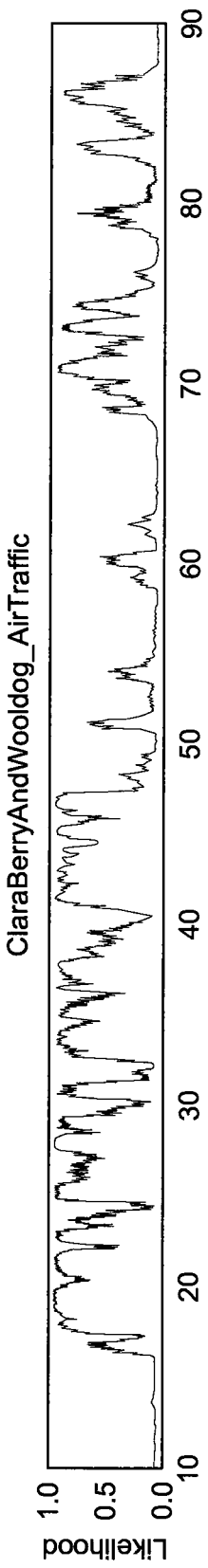
FIG. 10b shows a vocal likelihood.

Illustrated in FIGS. 10a and 10b, the temporal precision of these models can be seen as compared with the isolated vocal energy. Isolated vocal signal energy is represented in FIG. 10a, whereas vocal likelihoods are represented in FIG. 10b, as estimated by the type V model over the full audio mixdown (Spearman-r=0.781). Deviations between estimated likelihoods and the vocal energy are representative of true model errors. False negatives again correspond to vocal loudness relative to the mix, and false positives are caused by loud melodic contours. The Spearman rank-order correlation, while consistent with previously observed trends across models, provides more nuance. The greatest difference between models is >0.11, versus≈0.05 for maximum accuracy. In other example embodiments, pitch and loudness of a vocal track can be used to synthesize "imposters" with different timbres, e.g., a sine wave or flute, mixed with instrumental tracks, and used to measure Type I errors, i.e., false positives.

In another example aspect of the present application, frequency of the vocal activity signal can be used to synthesize a melody with different timbres to be mixed into an instrumental recording. Whereas before entangled pairs contrast the presence of vocals, this approach would yield pairs that differ only in the timbre of the voice. Alternatively, additional sources could be leveraged for building models invariant to less relevant characteristics, such as instrumental content without a corresponding "original" version, or multitrack audio.

Multitrack datasets like MedleyDB can provide good benchmarking. The isolated vocal signal provides an optimal reference signal, while the other, non-vocal stems can be recombined as needed to deeply explore system behavior. Using larger, more diverse evaluation datasets can be beneficial. Thus, as a first step toward these ends, machine estimations from the example models herein is provided over datasets, such as those described herein and publicly available datasets (with audio), to facilitate a manual annotation process. Though human effort can be used to verify or correct machine estimations, it is not required.

CONCLUSION

As described herein, the inventor has developed an algorithm that computes time-varying signals, e.g. the presence of vocals, automatically from a paired set of recordings. This approach is particularly effective for building systems, via methods like machine learning, that will operate on single inputs. An illustrative example is to measure the occurrence of a singing voice by aligning a full mix (an original recording) and a corresponding instrumental version.

This could be used to extract information for a variety of tasks, including but not limited to: singing voice detection, pinpointing explicit words in music, vocal similarity, melody tracking, production quality, automatic mixing, source separation, and lyrics transcription.

According to one example aspect of the present application, information is extracted from at least a pair of inputs. In one example, metadata about tracks is leveraged for this purpose, although other mechanisms can be employed to arrive at pairs of inputs (e.g., a first pass system pairs possible candidates as a function of similarity, fingerprinting, etc.).

A method according to an example aspect herein includes the following steps:

Given two signals (X, Y),

Compute a "feature" representation of each (X', Y'),

Find the optimal alignment between them, via dynamic time warping or equivalent, Extract pairwise information as a function of time, and Use this signal to train a machine learning system.

Notable distinctive aspects of the present technology include employing more than one input to compute output information of interest, whereas in prior systems it was assumed that only a primary signal was available for use in processing.

The example embodiments herein relate to an approach to mining strongly labeled data from web-scale music collections for detecting vocal activity in music audio. This is achieved by automatically pairing original recordings, containing vocals, with their instrumental counterparts, and using differential information to estimate vocal activity over time. The signal can be used to train deep convolutional neural networks, finding that the strongly labeled training data produces superior results to the weakly labeled setting, achieving state of the art performance.

In analyzing errors, three distinct lessons stand out. First, in addition to curation and mining, it is valuable to recall a third path to acquiring sufficiently large datasets: active learning. Imperfect models can be leveraged to make the annotation process more efficient by performing aspects of annotation that humans find particularly difficult or prioritizing data as a function of model uncertainty. Human annotators struggle to precisely label vocal activity in audio, resulting from the time and effort required to select time intervals in common annotation interfaces. Alternatively, a performant model, like those described herein, could segment audio into short, labeled excerpts for a human to verify or correct, eliminating a large time cost. This would allow reliable data to be obtained at a faster rate, accelerating improvements to the model, which further accelerates data collection, and so on.

Second, the application of machine learning to mined datasets can help identify particular challenges of a given task. The example model embodiment(s) herein identify an interesting bias in the dataset, being the tight coupling between singing voice (timbre), melody (pitch), and production effects (loudness). Often in Western popular music, lead vocals carry the melody and tend to be one of the more prominent sources in the mix. Thus, in the dataset mined from a commercial music catalogue, instrumental versions not only lack vocal timbres, but prominent melodic contours are missing as well.

Figure 11:
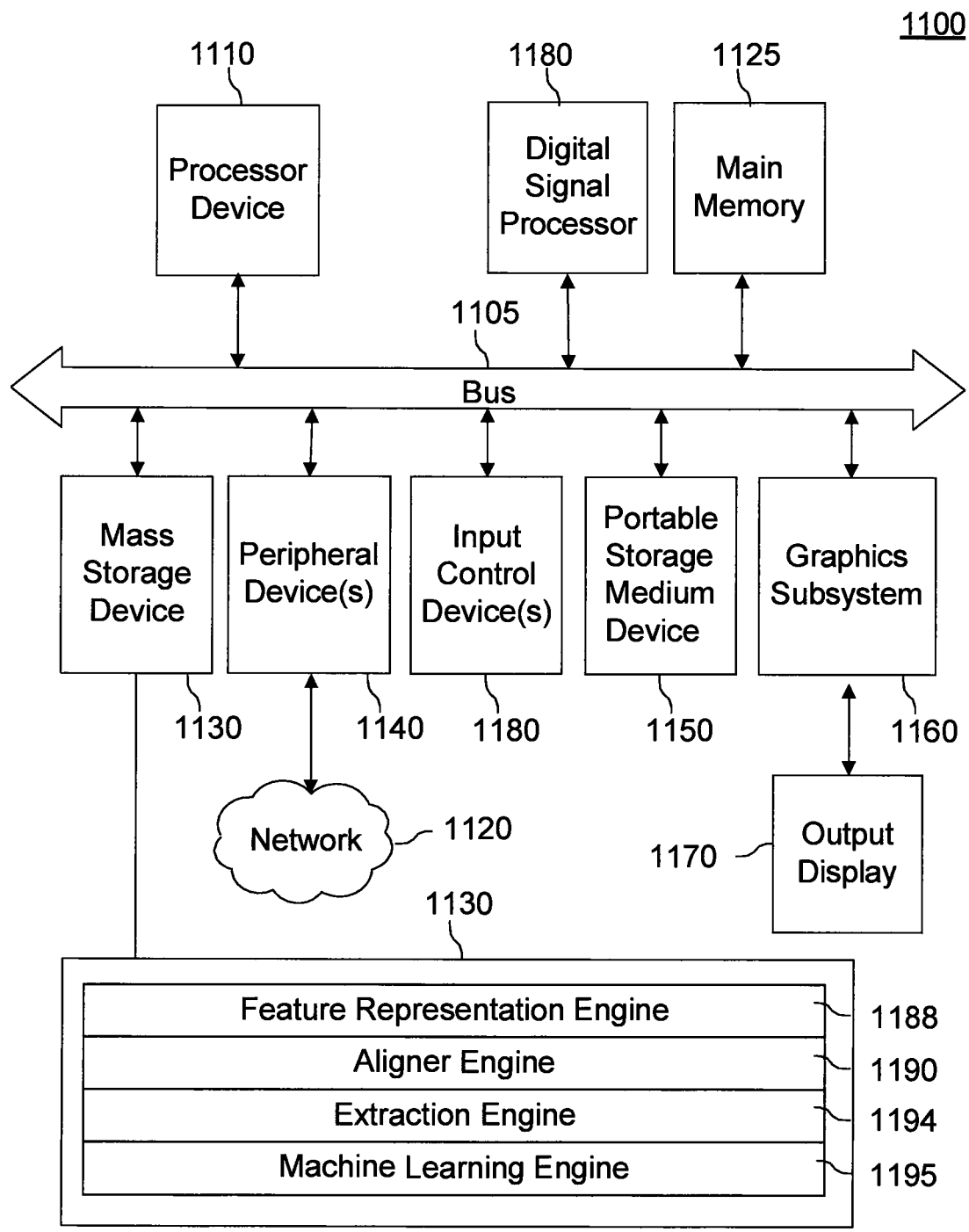
FIG. 11 is a block diagram showing an example acoustic attribute computation system constructed to realize the functionality of the example embodiments described herein.

FIG. 11 is a block diagram showing an example acoustic attribute computation system 1100 constructed to realize the functionality of the example embodiments described herein.

Acoustic attribute computation system 1100 may include without limitation a processor device 1110, a main memory 1125, and an interconnect bus 1105. The processor device 1110 (410) may include without limitation a single microprocessor, or may include a plurality of microprocessors for configuring the system 1100 as a multi-processor acoustic attribute computation system. The main memory 1125 stores, among other things, instructions and/or data for execution by the processor device 1110. The main memory 1125 may include banks of dynamic random access memory (DRAM), as well as cache memory.

The system 1100 may further include a mass storage device 1130, peripheral device(s) 1140, portable non-transitory storage medium device(s) 1150, input control device(s) 1180, a graphics subsystem 1160, and/or an output display interface 1170. A digital signal processor (DSP) 1180 may also be included to perform audio signal processing. For explanatory purposes, all components in the system 1100 are shown in FIG. 11 as being coupled via the bus 1105. However, the system 1100 is not so limited. Elements of the system 1100 may be coupled via one or more data transport means. For example, the processor device 1110, the digital signal processor 1180 and/or the main memory 1125 may be coupled via a local microprocessor bus. The mass storage device 1130, peripheral device(s) 1140, portable storage medium device(s) 1150, and/or graphics subsystem 1160 may be coupled via one or more input/output (I/O) buses. The mass storage device 1130 may be a nonvolatile storage device for storing data and/or instructions for use by the processor device 1110. The mass storage device 1130 may be implemented, for example, with a magnetic disk drive or an optical disk drive. In a software embodiment, the mass storage device 1130 is configured for loading contents of the mass storage device 1130 into the main memory 1125.

Mass storage device 1130 additionally stores a feature representation engine 1188 for computing feature representations of signals, an aligner engine 1190 for determining an optimal alignment between feature representations, an extraction engine 1194 for extracting a time varying activity signal from the feature representations, and a machine learning engine 1195 for learning from training data such as the extracted signal.

The portable storage medium device 1150 operates in conjunction with a nonvolatile portable storage medium, such as, for example, a solid state drive (SSD), to input and output data and code to and from the system 1100. In some embodiments, the software for storing information may be stored on a portable storage medium, and may be inputted into the system 1100 via the portable storage medium device 1150. The peripheral device(s) 1140 may include any type of computer support device, such as, for example, an input/output (I/O) interface configured to add additional functionality to the system 1100. For example, the peripheral device(s) 1140 may include a network interface card for interfacing the system 1100 with a network 1120.

The input control device(s) 1180 provide a portion of the user interface for a user of the computer 1100. The input control device(s) 1180 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 1100 may include the graphics subsystem 1160 and the output display 1170. The output display 1170 may include a display such as a CSTN (Color Super Twisted Nematic), TFT (Thin Film Transistor), TFD (Thin Film Diode), OLED (Organic Light-Emitting Diode), AMOLED display (Activematrix Organic Light-emitting Diode), and/or liquid crystal display (LCD)-type displays. The displays can also be touchscreen displays, such as capacitive and resistive-type touchscreen displays.

The graphics subsystem 1160 receives textual and graphical information, and processes the information for output to the output display 1170.

Input control devices 1180 can control the operation and various functions of system 1100.

Input control devices 1180 can include any components, circuitry, or logic operative to drive the functionality of system 1100. For example, input control device(s) 1180 can include one or more processors acting under the control of an application.

Each component of system 1100 may represent a broad category of a computer component of a general and/or special purpose computer. Components of the system 1100 (400) are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described herein.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIG. 11 is presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

REFERENCES

[1] Berenzweig, Adam L and Ellis, Daniel P W. Locating singing voice segments within music signals. *IEEE Workshop on Applications of Signal Processing to Audio and Acoustics*, 2001.

[2] Bittner, Rachel M, Salamon, Justin, Tierney, Mike, Mauch, Matthias, Cannam, Chris, and Bello, Juan Pablo. Medley D B: A multitrack dataset for annotation-intensive MIR research. In *Proceedings of the 15th International Society for Music Information Retrieval Conference (ISMIR)*, volume 14, pp. 155-160, 2014.

[3] Brown, Judith C. Calculation of a constant q spectral transform. *The Journal of the Acoustical Society of America*, 89(1):425-434, 1991.

[4] Carterette, Ben and Allan, James. Incremental test collections, U of Mass—Amherst, Computer Science Department Faculty Publication Series—ScholarWords@UMass Amherst, 8 sheets, 2005.

[5] Deng, Jia, Dong, Wei, Socher, Richard, Li, Li-Jia, Li, Kai, and Fei-Fei, Li. ImageNet: A Large-Scale Hierarchical Image Database, Dept. of Computer Science, Princeton University, USA, IEEE 2009 (8 sheets).

[6] Ellis, Daniel P W, Whitman, Brian, and Porter, Alastair. Echoprint: An open music identification service. In *Proceedings of the 12th International Society for Music Information Retrieval Conference (ISMIR)*. ISMIR, 2011 (2 sheets).

[7] Hamel, Philippe, Lemieux, Simon, Bengio, Yoshua, and Eck, Douglas. Temporal pooling and multiscale learning for automatic annotation and ranking of music audio. In *Proceedings of the 12th International Society for Music Information Retrieval Conference (ISMIR)*, pp. 729-734, 2011.

[8] Humphrey, Eric J and Bello, Juan Pablo. Rethinking automatic chord recognition with convolutional neural networks. In *International Conference on Machine Learning and Applications (ICMLA)*, volume 2, pp. 357-362. IEEE, 2012.

[9] Leglaive, Simon, Hennequin, Romain, and Badeau, Roland. Singing voice detection with deep recurrent neural networks. $40^{th}$ International Conference on Acoustics, Speech and Signal Processing (ICASSP), pp. 121-125. IEEE, 2015.

[10] Mauch, Matthias and Dixon, Simon. pYIN: A fundamental frequency estimator using probabilistic threshold distributions. 2014 IEEE *International Conference on Acoustics, Speech and Signal Processing (ICASSP)*, pp. 659-663. IEEE, 2014.

[11] Mauch, Matthias, Fujihara, Hiromasa, Yoshii, Kazuyoshi, and Goto, Masataka. Timbre and melody features for the recognition of vocal activity and instrumental solos in polyphonic music. *International Society for Music Information Retrieval Conference (ISMIR)*, pp. 233-238, 2011.

[12] Raffel, Colin and Ellis, Daniel P W. Large-scale content-based matching of MIDI and audio files. In *Proceedings of the 16th International Society for Music Information Retrieval Conference (ISMIR)*. ISMIR, 2015 (6 sheets).

[13] Rafii, Zafar and Pardo, Bryan. Repeating pattern extraction technique (REPET): A simple method for music/voice separation. *IEEE Transactions on Audio, Speech, and Language Processing*, 21(1):73-84, 2013.

[14] Ramona, Mathieu, Richard, Gaël, and David, Bertrand. Vocal detection in music with support vector machines.

International Conference on Acoustics, Speech and Signal Processing (ICASSP), pp. 1885-1888. IEEE, 2008.

[15] Regnier, Lise and Peeters, Geoffroy. Singing voice detection in music tracks using direct voice vibrato detection. *International Conference on Acoustics, Speech and Signal Processing (ICASSP)*, April 2009, Taipei, Taiwan (5 sheets).

[16] Schlüter, Jan. Learning to pinpoint singing voice from weakly labeled examples. In *Proceedings of the 17th International Society for Music Information Retrieval Conference (ISMIR)*, 2016 (7 sheets).

[17] Simpson, Andrew J R, Roma, Gerard, and Plumbley, Mark D. Deep Karaoke: Extracting vocals from musical mixtures using a convolutional deep neural network. In *Latent Variable Analysis and Signal Separation, International Conference on*, pp. 429-436. Springer, 2015.

[18] Zwillinger, D. and Kokoska, S. (eds.). *Standard Probability and Statistics Tables and Formulae*. Chapman & Hall, New York, N.Y., 2000.

What is claimed is:

1. A method for extracting an activity from recordings, comprising: searching for signals representing plural versions of a track, wherein one of the plural versions of the track is an instrumental track, and another one of the plural versions of the track is a non-instrumental track; determining features representations of the plural versions of the track identified in the searching; aligning the features representations determined in the determining; and extracting a time varying activity signal from the feature representations aligned in the aligning; removing suspect signals from the plural versions of the track searched in the searching; detecting the suspect signals by determining that at least two of the signals representing plural versions of the track overlap to a first predetermined extent, or do not overlap to a second predetermined extent.

2. The method of claim 1, wherein the time varying activity signal is a vocal activity signal.

3. The method of claim 1, wherein the searching includes identifying a first track among the plural versions of the track as an instrumental track and a second track among the plural versions of the track as a non-instrumental track, wherein the identifying includes determining at least one of:
   (i) that the first and second tracks are recorded by a same artist,
   (ii) that a title of at least one of the first and second tracks does not include predetermined information,
   (iii) that titles of the first and second tracks substantially match, and
   (iv) that durations of the first and second tracks differ by no more than a predetermined length of time.

4. The method of claim 1, wherein the determining includes determining a Time-Frequency Representation (TFR) of the plural versions of the track identified in the searching.

5. The method of claim 4, wherein the TFR is a Constant-Q Transform representation.

6. The method of claim 1, wherein the aligning includes Dynamic Time Warping (DTW).

7. The method of claim 1, wherein the extracting includes determining a residual based on the feature representations aligned in the aligning.

8. The method of claim 7, wherein the determining of the residual includes determining an amplitude of a time-frequency path defining the time varying activity signal.

9. A system for extracting an activity from recordings, comprising: storage for a program; and a computer processor, controllable by the program to perform: searching for signals representing plural versions of a track, wherein one of the plural versions of the track is an instrumental track, and another one of the plural versions of the track is a non-instrumental track, determining features representations of the plural versions of the track identified in the searching, aligning the features representations determined in the determining, and extracting a time varying activity signal from the feature representations aligned in the aligning; removing suspect signals from the plural versions of the track searched in the searching; detecting the suspect signals by determining that at least two of the signals representing plural versions of the track overlap to a first predetermined extent, or do not overlap to a second predetermined extent.

10. The system of claim 9, wherein the time varying activity signal is a vocal activity signal.

11. The system of claim 9, wherein the searching includes identifying a first track among the plural versions of the track as an instrumental track and a second track among the plural versions of the track as a non-instrumental track, and wherein the identifying includes determining at least one of:
   (i) that the first and second tracks are recorded by a same artist,
   (ii) that a title of at least one of the first and second tracks does not include predetermined information,
   (iii) that titles of the first and second tracks substantially match, and
   (iv) that durations of the first and second tracks differ by no more than a predetermined length of time.

12. The system of claim 9, wherein the determining includes determining a Time-Frequency Representation (TFR) of the plural versions of the track identified in the searching.

13. The system of claim 12, wherein the TFR is a Constant-Q Transform representation.

14. The system of claim 9, wherein the aligning includes Dynamic Time Warping (DTW).

15. The system of claim 9, wherein the extracting includes determining a residual based on the feature representations aligned in the aligning.

16. A non-transitory computer-readable medium storing a program which, when executed by a computer processor, cause the computer processor to perform a method for extracting an activity from recordings, the method comprising: searching for signals representing plural versions of a track, wherein one of the plural versions of the track is an instrumental track, and another one of the plural versions of the track is a non-instrumental track; determining features representations of the plural versions of the track identified in the searching; aligning the features representations determined in the determining; and extracting a time varying activity signal from the feature representations aligned in the aligning; removing suspect signals from the plural versions of the track searched in the searching; detecting the suspect signals by determining that at least two of the signals representing plural versions of the track overlap to a first predetermined extent, or do not overlap to a second predetermined extent.

17. A method for extracting an activity from recordings, comprising: searching for signals representing plural versions of a track; determining feature representations of the plural versions of the track identified in the searching; aligning the feature representations determined in the determining; and extracting a time varying activity signal from the feature representations aligned in the aligning, wherein the extracting includes determining a residual based on the feature representations aligned in the aligning and the determining of the residual includes determining an amplitude of a time-frequency path defining the time varying activity signal; removing suspect signals from the plural versions of the track searched in the searching; detecting the suspect signals by determining that at least two of the signals representing plural versions of the track overlap to a first predetermined extent, or do not overlap to a second predetermined extent.

18. The method of claim 17, wherein the time varying activity signal is a vocal activity signal.

19. The method of claim 17, wherein one of the plural versions of the track is an instrumental track, and another one of the plural versions of the track is a non-instrumental track.

20. The method of claim 17, wherein the searching includes identifying a first track among the plural versions of the track as an instrumental track and a second track among the plural versions of the track as a non-instrumental track, wherein the identifying includes determining at least one of:
  (v) that the first and second tracks are recorded by a same artist,
  (vi) that a title of at least one of the first and second tracks does not include predetermined information,
  (vii) that titles of the first and second tracks substantially match, and
  (viii) that durations of the first and second tracks differ by no more than a predetermined length of time.

21. The method of claim 17, wherein the determining includes determining a Time-Frequency Representation (TFR) of the plural versions of the track identified in the searching.

22. The method of claim 21, wherein the TFR is a Constant-Q Transform representation.

23. The method of claim 17, wherein the aligning includes Dynamic Time Warping (DTW).

24. A system for extracting an activity from recordings, comprising: storage for a program; and a computer processor, controllable by the program to perform: searching for signals representing plural versions of a track, determining feature representations of the plural versions of the track identified in the searching, aligning the feature representations determined in the determining, and extracting a time varying activity signal from the feature representations aligned in the aligning, wherein the extracting includes determining a residual based on the feature representations aligned in the aligning; removing suspect signals from the plural versions of the track searched in the searching; detecting the suspect signals by determining that at least two of the signals representing plural versions of the track overlap to a first predetermined extent, or do not overlap to a second predetermined extent.

25. The system of claim 24, wherein the time varying activity signal is a vocal activity signal.

26. The system of claim 24, wherein one of the plural versions of the track is an instrumental track, and another one of the plural versions of the track is a non-instrumental track.

27. The system of claim 24, wherein the searching includes identifying a first track among the plural versions of the track as an instrumental track and a second track among the plural versions of the track as a non-instrumental track, and wherein the identifying includes determining at least one of:
  (v) that the first and second tracks are recorded by a same artist,
  (vi) that a title of at least one of the first and second tracks does not include predetermined information,
  (vii) that titles of the first and second tracks substantially match, and
  (viii) that durations of the first and second tracks differ by no more than a predetermined length of time.

28. The system of claim 24, wherein the determining includes determining a Time-Frequency Representation (TFR) of the plural versions of the track identified in the searching.

29. The system of claim 28, wherein the TFR is a Constant-Q Transform representation.

30. The system of claim 24, wherein the aligning includes Dynamic Time Warping (DTW).

31. A non-transitory computer-readable medium storing a program which, when executed by a computer processor, cause the computer processor to perform a method for extracting an activity from recordings, the method comprising: searching for signals representing plural versions of a track; determining feature representations of the plural versions of the track identified in the searching; aligning the feature representations determined in the determining; and extracting a time varying activity signal from the feature representations aligned in the aligning, wherein the extracting includes determining a residual based on the feature representations aligned in the aligning; removing suspect signals from the plural versions of the track searched in the searching; detecting the suspect signals by determining that at least two of the signals representing plural versions of the track overlap to a first predetermined extent, or do not overlap to a second predetermined extent.

* * * * *